April 8, 1969
G. E. RICHMOND
3,436,830
TOOTH POLISHER WITH PUMICE SEAL
Filed Jan. 18, 1967
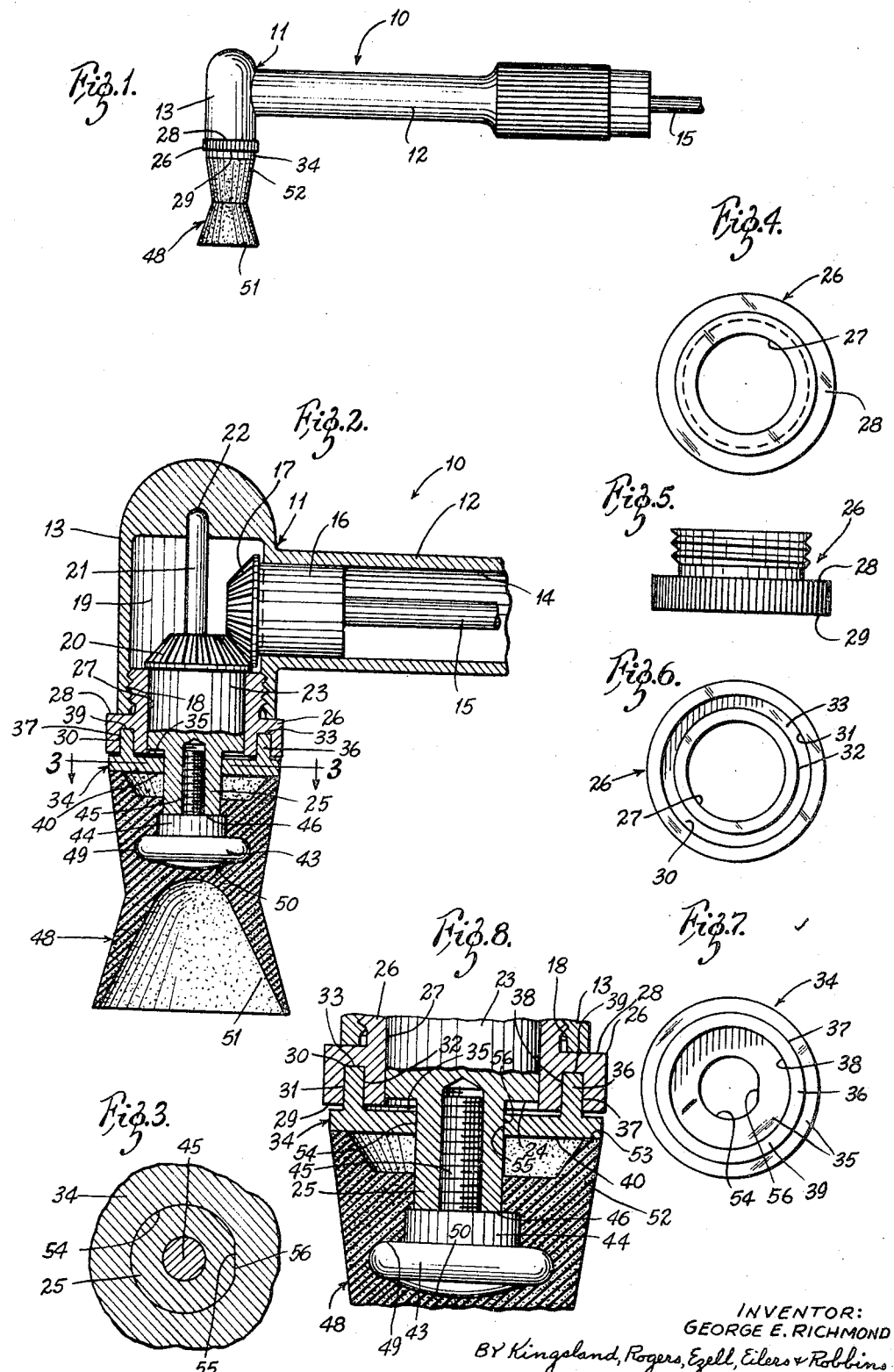
INVENTOR:
GEORGE E. RICHMOND
BY Kingsland, Rogers, Ezell, Eilers & Robbins
ATTORNEYS Patented Apr. 8, 1969

3,436,830
TOOTH POLISHER WITH PUMICE SEAL
George E. Richmond, 828 Fernview,
St. Louis, Mo. 63141
Filed Jan. 18, 1967, Ser. No. 610,138
Int. Cl. A61c 3/06
U.S. Cl. 32—59                            6 Claims

ABSTRACT OF THE DISCLOSURE

An apparatus for preventing pumice and other foreign matter from entering the gear chamber section of a dental handpiece. A bearing member is rotatable with the polisher and is positioned between the polisher and the bearing cap nut mounted in the open end of the angle nose with annular interfitting parts between the bearing member and the bearing cap nut to provide a pumice seal. The polisher has a resilient base which continuously applies pressure against the axially slidable bearing member to maintain continuous contact between the bearing member and the bearing cap nut to compensate for wear.

CROSS-REFERENCES TO RELATED APPLICATIONS

This invention is an improvement upon this applicant's earlier invention described and claimed in United States application Ser. No. 508,785, filed Nov. 19, 1966.

BACKGROUND OF THE INVENTION

Field of the invention

This invention pertains to the art of tooth cleaning and polishing apparatus having intermeshing driving gears for rotating a tooth polisher with a rotatable bearing member to prevent pumice and other foreign matter from entering the area occupied by the driving intermeshed gears. Pressure applied by the polishing member against the bearing member automatically compensates for wear on the bearing member.

Description of the prior art

The conventional tooth polisher has a handpiece comprising an angle member having an iner chamber housing driving and driven intermeshed gears, and the driven gear has a mandrel extending toward an open end of the chamber for supporting a tooth polisher. Pumice and other abrasives are applied to the tooth polisher when it is used to clean teeth, and in the conventional tooth polishers some of this pumice works its way into the gear chamber causing improper operation and damage. This invention solves this problem by providing a bearing member that rotates with the polisher and that has an annular relatively rotatable interfitting tongue and groove relationship with the opposing stationary portion of the handpiece to provide a seal against the flow of pumice and foreign matter. The invention further provides a relationship between the resilient polisher and the bearing member to compensate automatically for wear of the bearing member during continued rotation thereof.

SUMMARY

For this invention, there is the usual handpiece comprising an angle having a stem and a nose at right angles to the stem. The nose has a recess in it with an open mouth or end, and the recess houses a driving bevel gear and a driven bevel gear. A mandrel extends from the driven bevel gear through the mouth of the nose with a mandrel extension extending beyond the mandrel. A button is supported at the end of the mandrel extension, and a polisher of rubber or other resilient material is snapped onto the button.

For this invention, a bearing cap nut having an opening through which the mandrel extends is threaded into the mouth of the nose. The outer face of the bearing cap nut has an annular groove in it. A brass bearing member is rotatably mounted on the mandrel extension and has an annular tongue fitting in the annular groove of the bearing cap nut. The bearing member may be keyed to rotate with the driven gear and the polisher. The interfitting rotating contact between the annular tongue of the bearing member and the annular groove in the bearing cap nuts prevents pumice from entering the gear chamber. To compensate for wear between the contacting surfaces of the bearing member and the bearing cap nut, the polisher is sized or shaped to continuously bear against the outer side of the bearing member and bias the bearing member against the bearing cap nut to maintain the desired pumice seal. Standard polishers may be used with the angle, or a special polisher formed with an annular flared skirt may be used.

BRIEF DESCRIPTION OF THE DRAWING

FIGURE 1 is a side elevation view of the tooth polishing apparatus;

FIGURE 2 is an enlarged fragmentary view in longitudinal medial section through the front or operating end of the tooth polisher;

FIGURE 3 is a fragmentary enlarged view in section taken along the line 3—3 of FIGURE 2;

FIGURE 4 is a top plan view of the bearing cap nut;

FIGURE 5 is a side elevation view of the bearing cap nut;

FIGURE 6 is a bottom plan view of the bearing cap nut;

FIGURE 7 is a top plan view of the bearing member; and

FIGURE 8 is a reproduction on an enlarged scale, of a fragmentary portion of FIGURE 2.

DESCRIPTION OF THE PREFERRED EMBODIMENT

This tooth cleaning apparatus comprises a handpiece 10 in the form of an angle member 11 having a stem 12 and a nose 13 at right angles to the stem. The stem 12 has a hollow passage 14 through it to receive a rotatable drive shaft 15 to which a gear mandrel 16 and bevel gear 17 are connected. The nose 13 has an open internally threaded mouth 18 leading to an inner gear chamber 19 where the drive bevel gear 17 is located.

A driven bevel gear 20 is positioned within the gear chamber 19 in mesh with the drive gear 17. A locating and stabilizing shaft 21 extends from the bevel gear 20 and is journaled in a recess 22 in the head of the nose 13. A cylindrical mandrel 23 extends from the other side of the bevel gear 20 beyond the mouth 18 of the nose 13. There is an annular flat shoulder 24 at the outer side of the mandrel 23, surrounding a smaller diameter mandrel extension 25 which projects beyond the mandrel 23.

A bearing cap nut 26 is threaded into the mouth 18 of the nose 13. The bearing cap nut 26 has an inner cylindrical passage 27 through which the mandrel 23 extends and is rotatably journaled. The bearing cap nut 26 has an outwardly extending shoulder 28 that bears against the end of the nose 13 when the bearing cap nut is tightened in place. The bearing cap nut 26 also has a flat outer face 29 with an annular straight-sided groove 30 formed in it. The groove 30 has parallel cylindrical sides 31 and 32 at right angles to an annular base 33. The bearing cap nut 26 is preferably formed of steel.

A bearing member 34, of brass or other bearing material, has a flat inner surface 35 from which an annular straight-sided rib or tongue 36 projects. The rib or tongue 36 has parallel cylindrical sides 37 and 38 at right angles to an annular base 39. The length of the rib 36 is greater than the depth of the groove 30 so that the inner surface 35 of the bearing member 34 is spaced from the flat surface 29 of the bearing cap nut. The annular rib or tongue 36 fits within the groove 30 with the bases 33 and 39 in contact but with little or no contact between the walls 31 and 37 or the walls 32 and 38. The outer wall 40 of the bearing member 34 is preferably flat.

A button 43 has a base 44 and a stud 45 that is threaded into the mandrel extension 25. The base 44 is larger in diameter than the mandrel extension 25 and keeps the bearing member 34 from sliding off the mandrel extension when the polisher 48 is removed. The outer surface 46 of the button is usually about .100 to .200 inch from the surface 40 of the bearing member, although that dimension is not critical. The button supports a rubber or other resilient material polisher 48 having a recess 49 by which the polisher may be removably snapped onto the button 43 or may be permanently fastened thereto, with the base 50 of the recess 49 in contact with the surface 46 of the button 43. A standard polisher may be used, but for best results, the polisher 48 has an outer working surface 51 of conventional design, and at its other end has an outwardly flared skirt 52 having an annular bearing surface 53. When the button 43 is in place and the polisher 48 is in place, the location of the bearing member 34 relative to the skirt 52 flares the skirt further outwardly. This further flaring of the skirt 52 is resisted by the resilience of the skirt, so the skirt 52 applies a constant upward force against the bearing member 34, as viewed in FIGURES 2 and 8. It has been found that the distance between the face 40 of the bearing member 34 and the furthest extent 46 of the button 43 should be about .020 inch less than the uncompressed dimension of the polisher between the annular edge 53 defined by the skirt and the base 50 of the recess 49 that receives the polisher.

To assure rotation of the bearing member 34 the opening 54 through the bearing member 34 has a flat side 55 and the mandrel extension 25 has an opposing flat side 56. This keying is preferable to simply relying upon the pressure of the annular skirt 51 to rotate the bearing member 34.

In operation, the gear 17 drives the gear 20 to rotate the mandrel 23, the mandrel extension 25, the button 43, and the polisher 48, as is conventional. As these parts rotate, the bearing member 34 also rotates because, while the pressure of the annular skirt 52 tends to drive the bearing member 34, the opposing flat sides 54 and 55 between the bearing member and the mandrel extension assure rotation of the bearing member. As the bearing member rotates, its rib or tongue 36 rotates within the annular groove 30 and its annular base 39 rotates against the annular base 33 of the recess 31 of the bearing cap nut 26, these surfaces being held in contact by the constant pressure of the annular skirt 52 of the polisher 48. The pressure between the surfaces 39 and 33 provides a continuous seal against the passage of pumice into the gear chamber 19. These parts are held in contact by the annular skirt 52 even though wear may occur because of the continuous sliding action between the surfaces 33 and 39.

What is claimed is:
1. Tooth polishing apparatus comprising means defining a support, a recess in the support and opening through a side of the support, a mandrel rotatably mounted within the recess and having a mandrel body positioned within the recess and a mandrel extension projecting beyond the said side of the support, means to rotate the mandrel, a tooth polisher rotatable with the mandrel, and a bearing member mounted for axially slidable movement upon the mandrel and positioned between the tooth polisher and the said side of the support, the bearing member being rotatable relative to the support, and means at the base of the tooth polisher for continuously biasing the bearing member against the said side of the support during rotation of the mandrel, the polisher, and the bearing member.
2. The tooth polishing apparatus of claim 1 wherein the polisher is constituted of a resilient material and the biasing means comprises a skirt at the base of the polisher.
3. The tooth polishing apparatus of claim 1 including an annular tongue and groove engagement between the bearing member and the said side of the support.
4. The tooth polisher of claim 1 including means keying the bearing member to the mandrel to cause the bearing member to rotate with the mandrel.
5. The tooth polishing apparatus of claim 3 wherein the base of the tongue and the base of the groove are in slidable contact and maintain other parts of the bearing member in spaced relation to the said side of the support.
6. The tooth polishing apparatus of claim 1 wherein the support comprises a body and the said side of the support is defined by a nut threaded into the body.

References Cited

UNITED STATES PATENTS

| 1,720,017 | 7/1929 | Touchstone | 32—59 X |
| 2,202,299 | 5/1940 | Pelkey | 32—59 |
| 2,625,447 | 1/1953 | Van Deventer | 308—36.1 |
| 2,738,528 | 3/1956 | Fridge | 32—28 |

ROBERT PESHOCK, *Primary Examiner.*

CHARLES R. WENTZEL, *Assistant Examiner.*